May 29, 1956     H. H. BOHANNON     2,748,076
LIQUID PROPORTIONER
Filed Jan. 8, 1954     3 Sheets-Sheet 1
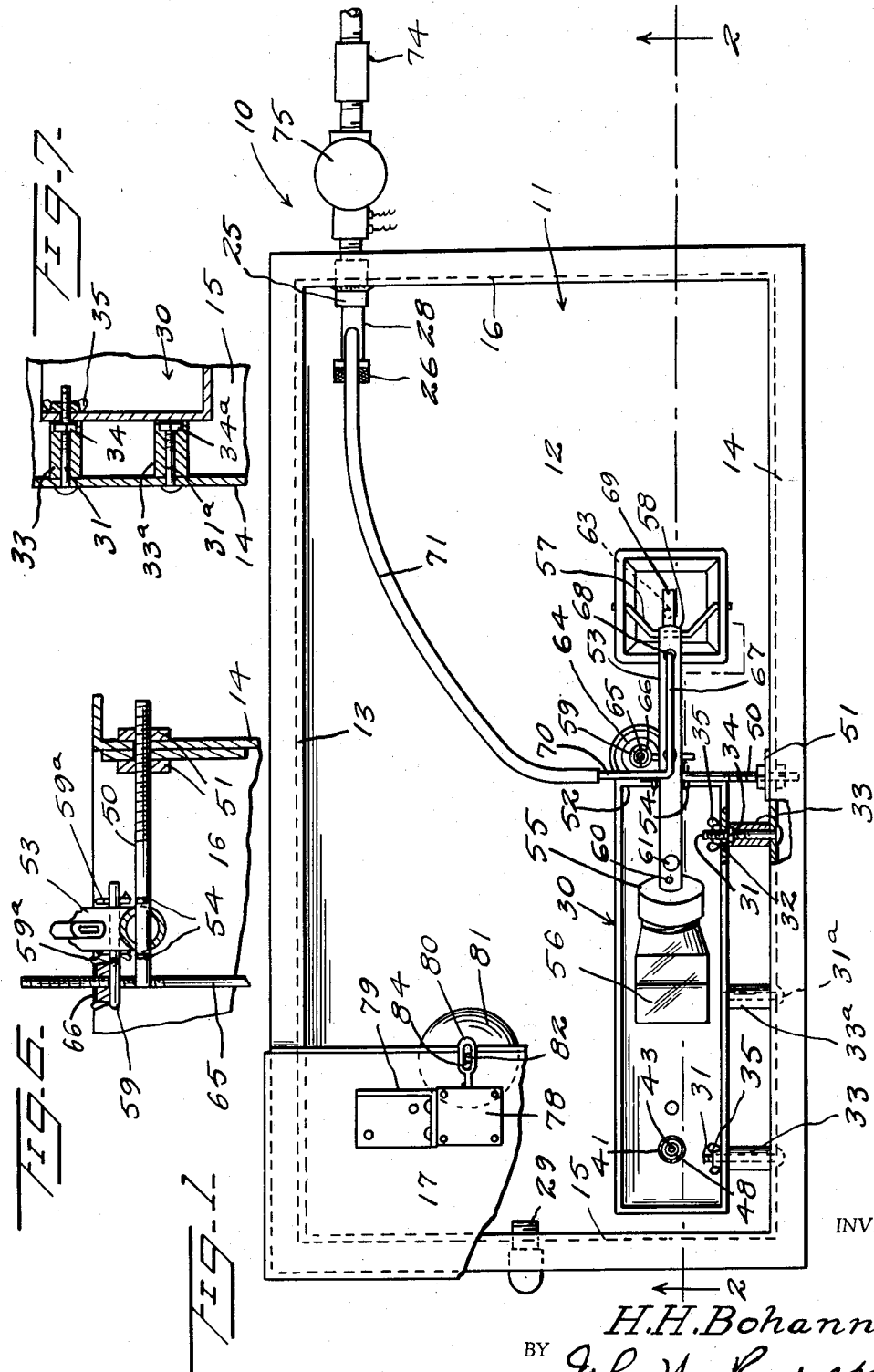
INVENTOR
H. H. Bohannon
BY John N. Randolph
ATTORNEY

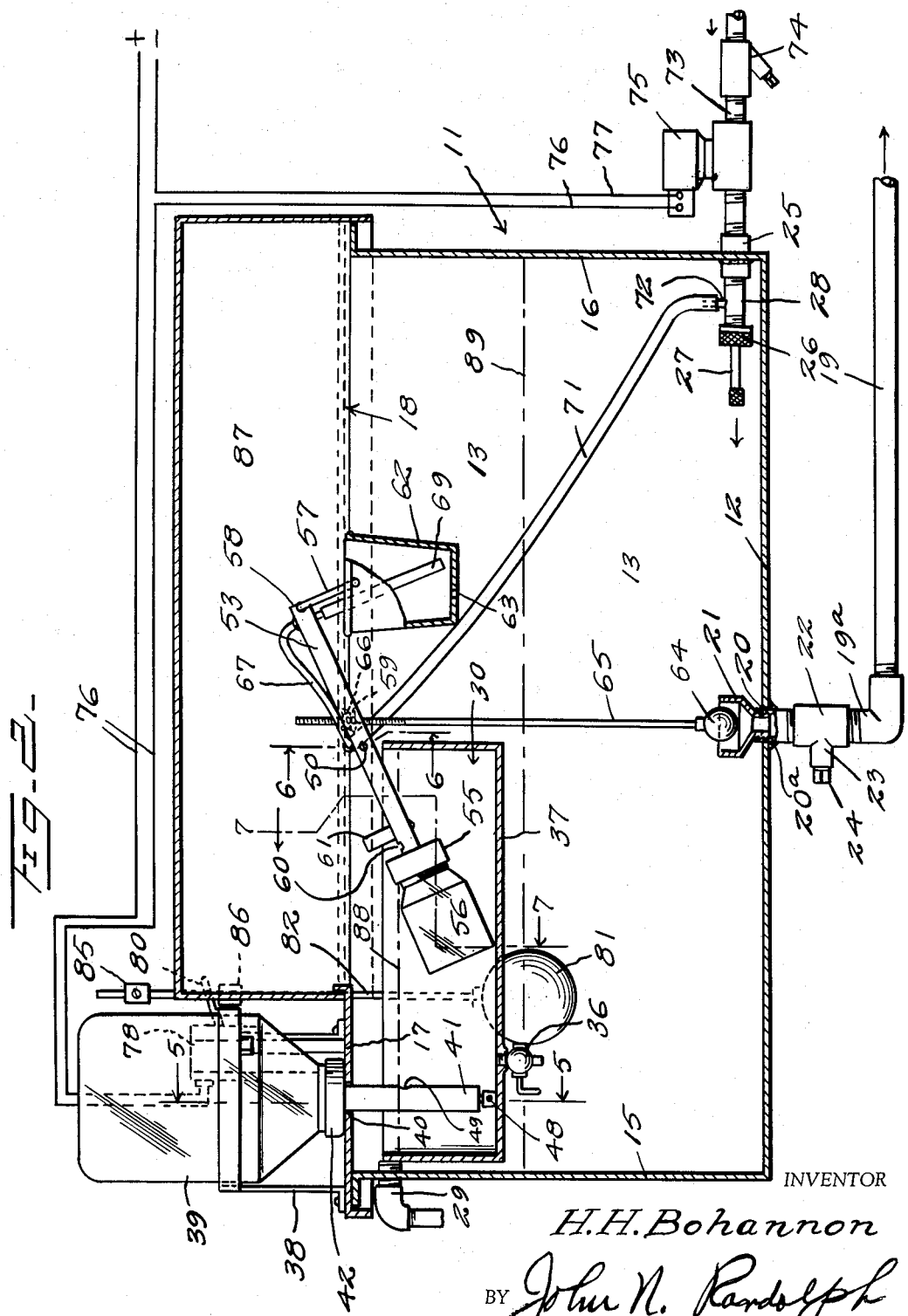

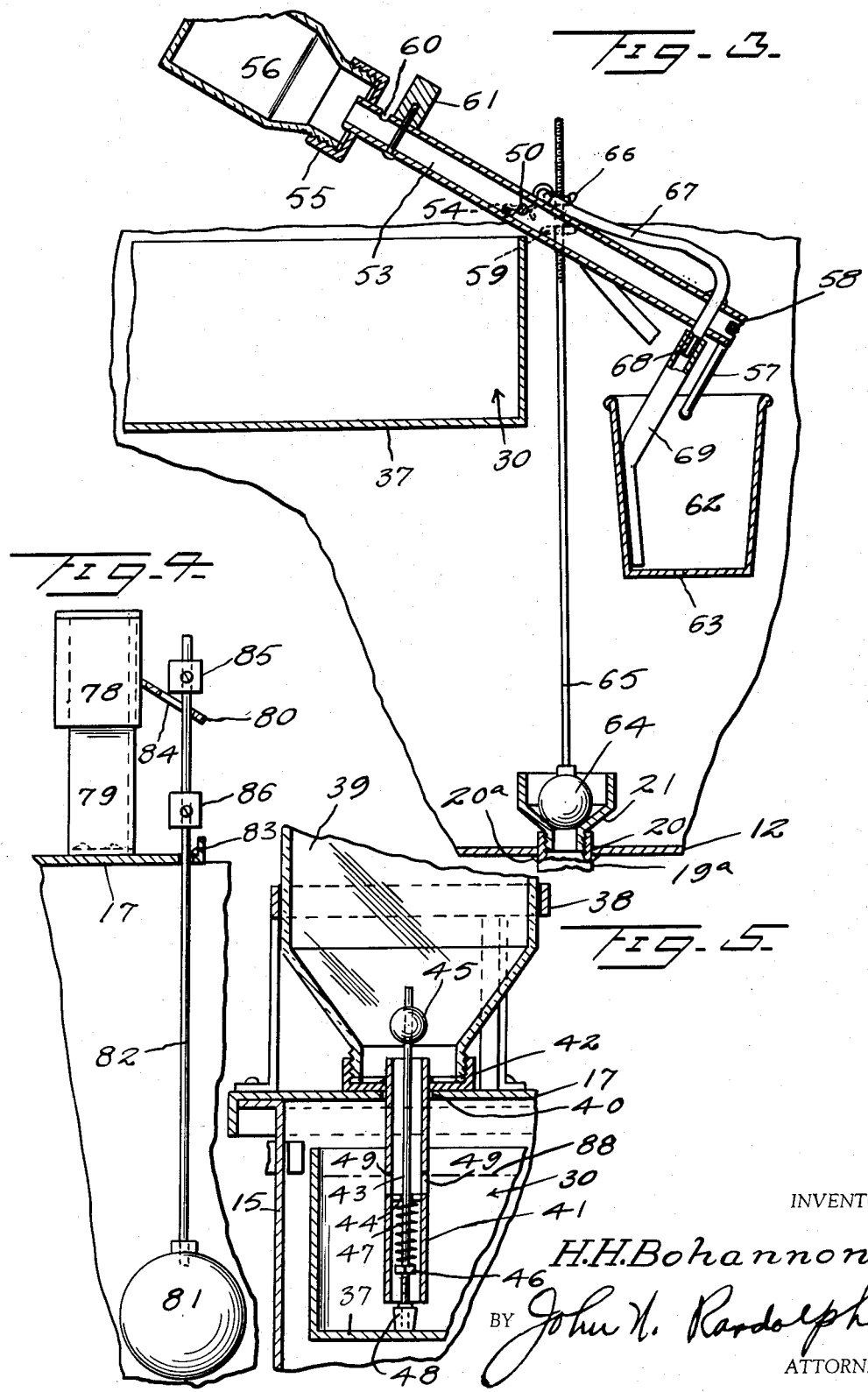

United States Patent Office 2,748,076
Patented May 29, 1956

2,748,076

LIQUID PROPORTIONER

Hoyt H. Bohannon, Albertville, Ala.

Application January 8, 1954, Serial No. 402,854

3 Claims. (Cl. 210—19)

This invention relates to an apparatus of extremely simple construction providing an inexpensive yet very efficient means for mixing two different types of liquids automatically in desired proportions and whereby the two liquids are thoroughly mixed and thereafter automatically discharged from a mixing chamber.

It is a primary object of the present invention to provide an apparatus adaptable to numerous uses requiring the mixing of two different types of liquids in predetermined proportions, such as in connection with the mixing of a liquid medicament with water to be supplied as drinking water to poultry and livestock and in the mixing of a chemical with water in connection with the purification of water.

Another object of the invention is to provide a mixing apparatus of unique construction wherein a portion of one of the liquids supplied is utilized as a weight for effecting operation of the mixing unit and for closing the outlet of the mixing chamber until mixing of the liquids has been accomplished and for thereafter returning the parts to their initial positions for opening the mixing chamber to permit release of the mixed liquids therefrom.

Still a further object of the invention is to provide a mixing apparatus having novel means for proportioning the amount of one of the liquids supplied to the mixing chamber with the other liquid supplied and including novel means for maintaining constantly available a storage supply of the first liquid.

Still a further object of the invention is to provide automatically operated electrical means actuated in response to the liquid level within the mixing chamber for automatically commencing and interrupting the mixing operation.

Various other objects and advantages of the invention will hereinafter become more fully apparent from the following description of the drawings, illustrating a presently preferred embodiment thereof, and wherein:

Figure 1 is a fragmentary top plan view of the apparatus with a substantial portion of the cover omitted;

Figure 2 is a longitudinal sectional view taken substantially along a plane as indicated by the line 2—2 of Figure 1 and showing the cover applied;

Figure 3 is an enlarged fragmentary vertical sectional view taken substantially along a plane corresponding to the plane of Figure 2 and showing the parts in the positions assumed for mixing of the liquids;

Figure 4 is a fragmentary longitudinal sectional view of a portion of the apparatus showing the positions of certain of the parts of the apparatus at the commencement of the mixing operation;

Figure 5 is a fragmentary enlarged vertical sectional view taken substantially along a plane as indicated by the line 5—5 of Figure 2;

Figure 6 is an enlarged fragmentary vertical sectional view taken substantially along a plane as indicated by the line 6—6 of Figure 2, and Figure 7 is an enlarged fragmentary vertical sectional view of a portion of the apparatus, taken substantially along a plane as indicated by the line 7—7 of Figure 2.

Referring more specifically to the drawings, the liquid proportioner in its entirety and comprising the invention is designated generally 10 and includes an open top mixing tank designated generally 11 having a bottom 12, side walls 13 and 14 and end walls 15 and 16. The tank is provided with a removable cover composed of a relatively small section 17 which is disposed over the end of the tank located adjacent the end wall 15 and a larger cover section 18 which covers the remainder of the tank, as best illustrated in Figure 2. The tank 11, as will hereinafter be described, constitutes a supply tank for poultry or livestock drinking fountains or the like, not shown, which are supplied with a mixed liquid from the tank 11 through a conduit 19 having an upwardly extending inlet end 19a which extends into the tank 11 through an opening 20 in the bottom thereof, said inlet portion being suitably sealed as seen at 20a to the tank bottom around the opening 20. A flared upwardly opening tubular valve seat 21 is secured in the upper end of said inlet portion 19a and supported thereby within the tank 11. A T-coupling 22 is interposed in the conduit portion 19a beneath the bottom 12 having a lateral branch 23 normally closed by a removable drain plug 24, by means of which the tank 11 may be drained when desired without the liquid therefrom passing through a portion of the conduit 19 disposed beneath said coupling 22. The opening 20 is located adjacent the side wall 14, as seen in Figure 1.

A pipe coupling 25 extends through and is welded or otherwise suitably secured in the end wall 16 adjacent the bottom 12 and side wall 13 to the inner end of which is connected a short pipe 26, which is disposed in the tank 11. A nozzle 27 of small external and internal diameter is disposed within the tank 11 and is connected by a reducer coupling 28 to the opposite end of the conduit member 26. An overflow pipe or conduit 29 has an upper horizontal and extending into the upper part of the tank 11 through the end wall 15, said overflow pipe extending downwardly on the outer side of the end wall, as illustrated in Figure 2.

An elongated open top relatively deep and relatively narrow receptacle 30 is supported within the tank 11 adjacent its open top, longitudinally thereof and adjacent the side wall 14 and end wall 15. The receptacle 30 is supported by a pair of bolts 31 which extend inwardly through and are supported by the side wall 14 and which pass through openings 32 in one side wall of the receptacle 30. The bolts 31 carry resilient bushings or bumper sleeves 33 which are disposed thereon between the wall 14 and the adjacent receptacle wall and which are held in applied positions by nuts 34 threaded on the bolts 31 and which are embedded in the bushings 33. Wing nuts 35 are detachably applied to inner ends of the bolts 31 to clamp said aforementioned receptacle wall between the bushings 33 and said wing nuts 35. The aforementioned receptacle wall is also braced adjacent its bottom by a bushing 33a disposed between said receptacle wall and the wall 14 and supported by a bolt 31a and a nut 34a, as seen in Figure 7. The nut 34a is disposed similarly to the nut 34 but the bolt 31a terminates adjacent said nut inwardly of the end of the bushing 33a which abuts the receptacle wall. Thus, by removing the two wing nuts 35 the receptacle 30 can be readily removed from the tank 11. As best seen in Figure 2, a drain cock 36 is provided in the bottom 37 of the receptacle 30, by means of which said receptacle can be drained, when desired, without being removed from the tank 11. A container supporting frame 38 is mounted on and secured to the cover section 17 above the end of the receptacle 30, which is located adjacent the end wall 15 for supporting a storage container such as a large bottle or jug 39 in an inverted position over an opening 40 of the cover section 17. The upper portion of a tube 41 extends upwardly from the receptacle 30 through the opening 40 and into a cap 42, to which said tube end is connected and which cap rests upon the cover section 17 and is detachably connected to the neck of the jar or bottle 39 to provide a passage between said bottle and tube 41. As best seen in Figure 5, a valve stem 43 extends loosely through the tube 41 and slidably engages a guide 44 which is disposed in a part of said tube. A valve 45 is secured to an upper part of the stem 43 and is disposed within the container 39 to seat in and close the upper end of the tube 41. An adjustable spring stop 46 is mounted on the stem 43 below the guide 44 and an expansion spring 47 is disposed on the stem between the guide 44 and stop 46 to urge the stem 43 downwardly for moving the valve 45 to a closed position. A head or knob 48 may be provided on the lower end of the stem 43 and is so disposed that when the cap 42 is resting on the cover section 17 the head 48 will engage the bottom 37 to displace the stem 43 upwardly to open the valve 45. Thus, the tube 41 and cap 42 and parts connected thereto may be assembled on the container 39 after which the container may be inverted and applied with said parts to their positions of Figure 5 with the valve 45 maintained closed until the cap 42 substantially contacts the cover section 17. The tube 41 is provided with one or more air vent openings 49 all disposed at the same level with their upper portions beneath and adjacent the open top of the receptacle 30, as seen in Figure 5.

A rod 50 has a threaded end extending through the upper portion of the tank wall 14 and adjustably secured thereto by a fastening means 51 for positioning said rod above and adjacent the inner end wall 52 of the receptacle 30. The rod 50 extends diametrically through a rigid pipe 53 at a point spaced from the ends thereof and provides a fulcrum on which said pipe is adapted to rock. Cotter pins 54 or the like extend through the rod 50 and straddle the pipe 53 for detachably mounting the pipe thereon and for limiting sliding movement of the pipe longitudinally of the rod. One end of the pipe 53 extends over or into the receptacle 30 and through a threaded cap 55 which is secured thereto and which is detachably connected to a neck of a measuring bottle or jar 56 or similar container which is sized to loosely fit in the receptacle 30. A bail 57 is fixed to and depends at substantially a right angle from the other discharge end 58 of the pipe 53. An eyebolt 59 extends diametrically through and is turnably mounted in the pipe 53, parallel to and adjacent the rod 50 between said rod and the discharge end 58. The eyebolt shank is retained nonslidably in the pipe 53 by cotter pins 59a. An inlet port 60 is formed in the upper part of the pipe 53 on the outer side of and adjacent the cap 55. A weight 61 is also supported detachably on the pipe 53 adjacent the cap 55, as best seen in Figure 3. A bucket or similar container 62 is swingably supported in a conventional manner by the depending end of the bail 57. Said bucket 62 is provided with a relatively small drain opening 63 in the bottom thereof.

A valve 64 normally seats in and closes the valve seat 21 and has an elongated valve stem 65 fixed thereto and extending upwardly therefrom. The upper portion of the stem 65 which is threaded extends loosely through the swivelly mounted eyebolt 59 and a nut 66 is adjustably mounted thereon to bear on the upper side of the bolt eye.

A substantially rigid tube 67 has an intermediate portion disposed on and secured to the upper part of a portion of the pipe 53 and includes a discharge end 68 which extends diametrically downwardly through the pipe 53 adjacent its outlet end 58. As best seen in Figure 3, one end of a flexible conduit 69 is connected to the outlet tube end 68 and extends downwardly therefrom into the bucket 62. The other inlet end 70 of the tube 67 extends laterally from the pipe 53, substantially above the fulcrum rod 50 and toward the side wall 13 and is connected to the outlet end of a flexible conduit 71. The other end of the conduit 71 connects with an outlet nipple 72 which forms a lateral extension of the conduit element 28.

The outlet end of a supply conduit 73 is connected to the outer end of the pipe coupling 25. Said conduit 73 preferably constitutes a water conduit connected to a source of water supply under pressure and is provided with a conventional strainer 74, located adjacent its outlet end for catching any sediment or foreign matter passing through the supply conduit.

A normally closed electrically opened valve of any conventional type, designated 75, is interposed in the conduit 73 between the strainer 74 and coupling 25 and is connected to a source of electric current, not shown, by conductors 76 and 77. As seen in Figure 2, the conductor 76 has an electric switch 78 interposed therein and which is supported above the cover section 17 by a post 79 which is fixed to and rises from said cover section and near the side wall 13. The switch 78 may be of any conventional type, preferably of the toggle switch type having a switch arm 80 extending outwardly therefrom and which is vertically swingable to an upper circuit interrupting position, as seen in Figure 2, or to a lower circuit closing position, as seen in Figure 4. A float 81 is disposed in the tank 11 and has a stem 82 extending upwardly therefrom between the tank wall 13 and receptacle 30 and which extends slidably through an opening 83 in the cover section 17 and loosely through an eye 84 of the switch arm 80. The stem 82 has stops 85 and 86 adjustably fixed thereto above and below the switch arm 80, respectively.

The cover 17 includes a raised or hood portion 87 extending from end-to-end thereof adjacent the side wall 14 beneath which the pipe 53 and parts connected thereto are disposed and into which portions of said pipe and said parts are swingably movable, as seen in Figure 2.

To initially place the apparatus 10 into operation, the receptacle 30 is filled with a liquid, which may be assumed to be a medication liquid, up to a level adjacent the open top thereof, after which the storage container or jug 39 with the tube 41 applied thereto and which has been previously filled with the same liquid, is applied and assumes its position of Figure 2, as previously described. The valve 45 thereof being opened by the head 48 contacting the receptacle bottom 37, additional liquid will flow from the container 39 into the receptacle 30 until the liquid level in the receptacle seals off the vent opening or openings 49. Thus, so long as liquid remains in the container 39 the receptacle 30 will be maintained filled up to the liquid level 88, as illustrated in Figures 2 and 5. The weight of the empty measuring jar 56 and weight 61 will be sufficient to overcome the weight of the bucket 62 so that the pipe 53 will assume its position of Figure 2. Accordingly, as soon as the receptacle 30 is filled, the jar 56 will be filled therefrom through the inlet port 60 which is disposed below the liquid level line 88. The tank being empty, the float 81 will be in its position of Figure 4. When the conductors 76 and 77 are connected to a source of electric current, the valve 75 will be immediately energized since the switch 78 will be in its circuit closing position of Figure 4. Accordingly, water will be supplied under pressure through the line 73, the flow of which will be materially restricted by the nozzle 27, so that a part of the water will be supplied under pressure from the fitting 28 through the tubes 71, 67 and 69. As a result, the bucket 62 will be rapidly filled as water will be supplied thereto much more rapidly than it can drain therefrom through the drain opening 63. When the bucket 62 has been nearly filled, the weight of its contents will overcome the weight of the filled measuring jar 56 and weight 61 to cause the pipe 53 to swing on the pivot rod 50 from its position of Figure 2 to its position of Figure 3, and in which latter position the medicated liquid will flow by gravity from the container 56 through the pipe 53 out of the discharge end 58 thereof with a majority of the medicated liquid flowing over the right-hand edge of the rim of the bucket 62, which is disposed as seen in Figure 3 relatively to said discharge end 58. However, any liquid from the pipe 53 falling into the bucket 62 will escape therefrom with the water which is overflowing the rim of the bucket. When the pipe 53 assumes its position of Figure 3 the valve 64 will assume a closed position by gravity to prevent escape of liquid from the tank 11 through the conduit 19. Water from the supply line 73 will be discharged under high pressure into the tank 11 from the nozzle 27 to produce a swirling and relatively violent agitation of the water within the tank for thoroughly mixing the water with the medicated liquid from the pipe 53. When the liquid level within the tank 11 has risen to approximately the line as indicated at 89 in Figure 2, the float 81 will have been lifted sufficiently so that the lower stop 86 will have swung the switch arm 80 to its uppermost position to cause the switch 78 to break the electric circuit of the valve 75, permitting said valve to resume a closed position and shutting off the supply of water from the line 73. When this occurs, liquid remaining in the bucket 62 will be rapidly drained therefrom partially through the drain port 63 and primarily by a siphoning action back through the tubes 69, 67 and 71 into the fitting 28 and through the nozzle 27 into the tank 11. When the bucket 62 has thus been substantially drained, the weight 61 and jar 56 will overcome the weight of the empty bucket 62 to return the pipe 53 to its position of Figure 2 for refilling the jar 56 with the medicated liquid from the receptacle 30, as previously described, and for opening the valve 64 so that the water contained in the tank 11 and mixed in a proper proportion with the medicated liquid may then be drained off as required through the conduit 19 to drinking fountains or troughs. Thereafter, when the liquid level in the tank 11 falls sufficiently so that the float 81 will have substantially reached its position of Figure 4, the upper stop 85 by engagement above the switch lever 80 will have swung said lever back downwardly to its lowermost position to again close the switch 78 for re-energizing the valve 75 whereby the operation as previously described will be repeated automatically.

Obviously, the size of the measuring jar 56 may be varied and the location of the stops 85 and 86 on the rod 82 may be varied for varying the proportion of the medicated liquid and water supplied to the tank 11, each time that the valve 75 is energized. It will also be obvious that the measuring apparatus 10 may be employed for mixing any other two liquids in desired proportions.

Various modifications and changes are contemplated and may obviously be resorted to, without departing from the spirit or scope of the invention as hereinafter defined by the appended claims.

I claim as my invention:

1. A liquid proportioning apparatus comprising a tank, means supplying a first liquid under pressure to said tank, an open top receptacle, means supporting said receptacle adjacent a wall of the tank, means supplying a second liquid to said receptacle for automatically maintaining a predetermined liquid level of the second liquid within the receptacle, a pipe, means fulcruming said pipe at a point spaced from its ends above the level of said receptacle, a measuring container connected to one end of said pipe and communicating therewith and supported thereby for swinging movement with said pipe end into and out of the receptacle, said measuring container being in communication with the second liquid when said measuring container is disposed within the receptacle to be filled with a predetermined quantity of the second liquid, an open top container supported on and disposed beneath the other discharge end of the pipe and supported thereby within or above the tank, a conduit having one end connected to said first liquid supply means and an opposite end discharging into said open top container whereby when liquid is supplied to the open top container through said conduit said pipe will be rocked about the fulcrum means to elevate the measuring container above the level of the discharge end of the pipe whereby a pre-measured quantity of the second liquid will be discharged from the outlet end of the pipe to be mixed with the first liquid within said open top container, and means for draining the contents of the open top container into the tank when the supply of the first liquid thereto is shut off for lightening said open top container whereby the weight of the measuring container will rock the pipe in the opposite direction about the fulcrum means to return the measuring container to a position within the receptacle to be refilled with the second liquid, said tank having an outlet in the bottom thereof from which the mixed liquids are discharged, a valve closing said tank outlet, and means connecting said valve to said pipe whereby the valve is moved to an open position when the discharge end of the pipe is elevated and returned to a closed position when the discharge end of the pipe is lowered for discharging the second liquid from the measuring container into the tank.

2. An apparatus as in claim 1, said first liquid supply means including a nozzle discharging directly into the tank adjacent the bottom thereof and through which a portion of the first liquid is supplied under pressure directly into the tank from said first liquid supply means for agitating and thoroughly mixing the two liquids within said tank.

3. An apparatus as in claim 1, a valve mounted in said first liquid supply means for shutting off the supply of the first liquid to said conduit and tank, said drainage means comprising a siphon including said conduit, a part of said first liquid supply means and the nozzle whereby liquid from the open top container is siphoned into the tank when the last mentioned valve is in a closed position.

References Cited in the file of this patent

UNITED STATES PATENTS

| | | |
|---|---|---|
| 926,843 | Bartlett | July 6, 1909 |
| 1,007,176 | Bartlett | Oct. 31, 1911 |
| 2,105,078 | Hill | Jan. 11, 1938 |
| 2,586,169 | Kline | Feb. 19, 1952 |

OTHER REFERENCES

Breder et al.: Zoologian, Scientific Contributions of the N. Y. Zoological Society. January 28, 1931, page 439, Fig. 341.